Figure 1:
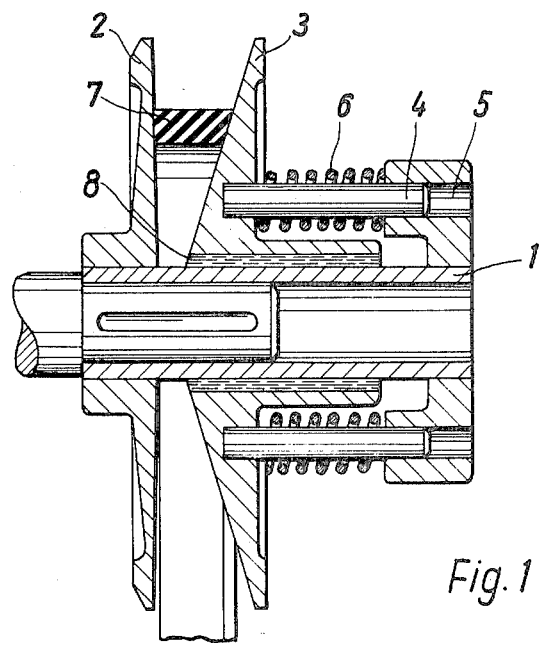

United States Patent

[11] 3,628,389

| [72] | Inventors | Hans Wiegelmann;<br>Helmut Germann, both of 6349<br>Sinn, Dillkreis, Germany |
|---|---|---|
| [21] | Appl. No. | 13,736 |
| [22] | Filed | Feb. 24, 1970 |
| [45] | Patented | Dec. 21, 1971 |
| [32] | Priority | Feb. 27, 1969 |
| [33] | | Germany |
| [31] | | P 19 09 887.4 |

[54] INFINITELY VARIABLE SPEED BELT TRANSMISSION WITH CONICAL PULLEYS
7 Claims, 2 Drawing Figs.

[52] U.S. Cl. .................................................. 74/230.17
[51] Int. Cl. ........................................................ F16h 55/52
[50] Field of Search ........................................... 74/230.17
TL, 230.17 A, 230.17 CC

[56] References Cited
UNITED STATES PATENTS

| 2,678,566 | 5/1954 | Oehrli | 74/230.17 TL |
|---|---|---|---|
| 2,711,103 | 6/1955 | Miner | 74/230.17 TL |
| 2,951,388 | 9/1960 | Tacquet | 74/230.17 TL |
| 3,383,934 | 5/1968 | Flynn | 74/230.17 C |
| 3,386,300 | 6/1968 | Maurey et al. | 74/230.17 C |

Primary Examiner—C. J. Husar
Attorney—Kurt Kelman

ABSTRACT: One of the two conical pulley discs mounted on a common shaft of an infinitely variable speed belt transmission has a central bore lined with a smoothly cylindrical antifriction bushing which permits free movement of the disc on the shaft in an axial direction and does not interfere with rotation of the disc on the shaft. The bushing has a continuous metallic backing fixedly fastened to the axially movable disc and a facing of porous sintered metal on the backing and engaging the shaft, the pores of the facing being filled at least partly with a solid fluorocarbon.

INFINITELY VARIABLE SPEED BELT TRANSMISSION WITH CONICAL PULLEYS

This invention relates to infinitely variable speed belt transmissions, and particularly to a bearing arrangement for mounting an axially movable disc of a split V-belt pulley on the associated shaft.

It has been common practice to secure the axially movable disc of a V-belt pulley in an infinitely variable speed belt transmission on the associated shaft against rotation by means of a key or spline. The known arrangements are subject to fretting corrosion if the movably engaged faces of the disc and shaft consist of metal, and if the transmission is used for extended periods under unfavorable environmental conditions.

Attempts have been made to overcome fretting corrosion by the use of more resistant materials, but no practical combination of materials has been found heretofore which would avoid fretting corrosion without introducing other disadvantages such as excessive wear under the cyclic compressive stresses inherent in the fact that the V-belt is wrapped over only a portion of the pulley circumference. When the bore of the disc is widened slightened or the shaft surface is flattened, the wobble of the disc, slight though it may be initially, causes an increasingly rapid widening of the bearing clearance. Many of the materials proposed for overcoming fretting corrosion also lack optimal frictional properties, and thus interfere with the desired precise adjustment of the transmission ratio by axial disc movement which is normally controlled by a spring or otherwise in response to the transmitted torque.

It has now been found that the shortcomings of the known V-belt pulleys can be overcome without loss of other desirable properties if the axially movable disc of the pulley is coupled to the shaft without the use of a key or spline by a coupling arrangement which engages a portion of the disc spaced from the shaft in a radially outward direction. This permits the use of an antifriction bushing interposed between the disc and the shaft which has continuously cylindrical inner and outer faces so as to permit axial and rotary movement of the disc on the shaft, rotary movement being impeded solely by the coupling arrangement.

Figure 2:
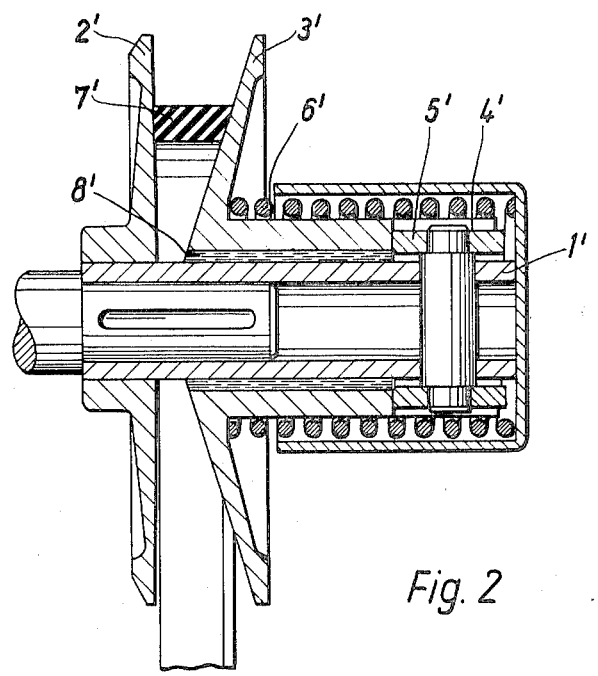

Other features, additional objects, and many of the attendant advantages of this invention will readily be appreciated as the same becomes better understood by reference to the appended drawing illustrating preferred embodiments in which:

FIG. 1 shows one-half of an infinitely variable speed belt transmission of the invention in axial section; and FIG. 2 illustrates another transmission of the invention in the manner of FIG. 1.

Referring now to the drawing in detail, and initially to FIG. 1, there is seen only as much of an otherwise conventional infinitely variable speed belt transmission as is needed for an understanding of this invention.

A shaft 10 is driven by a prime mover, not itself seen, and carries a fixed sleeve 1 which, for the purpose of this application, is an integral part of the shaft. Two discs 2, 3 are mounted on the shaft to form a V-belt pulley. The disc 2 is fixedly fastened on the sleeve 1 by means of a press fit. The pulley 3 is axially movable toward and away from the pulley 2 as will presently be described in more detail. The axially opposite, radially extending faces of the pulleys 2, 3 are conical so as to flare axially in a radially outward direction. The apex angle of the conical face on the disc 2 is almost 180°, and the corresponding angle of the disc 3 is somewhat smaller.

The disc 3 is coupled to the shaft 10 by means of several rods or pins 4 equiangularly spaced about the axis of the shaft 10 and axially projecting from the disc 3 away from the disc 2. The free ends of the pins 4 are slidably received in mating bores of a collar 5 fixedly mounted on the sleeve 1. Compression springs 6 respectively coiled about the pins 4 abut against the disc 3 and the collar 5 and urge the disc 3 to move axially toward the disc 2 and thereby to engage a V-belt 7 received in the gap between the opposite conical faces of the discs, 2, 3 as is conventional in itself.

A bushing 8 lines the bore of the disc 3 and its cylindrically tubular hub and is fastened to the disc by a press fit. The bushing is of the type known in itself and not illustrated in detail in which a solid metal backing carries a layer of porous sintered powder metal. Best results have been obtained with bushings having an outer shell of steel whose inner face is copper plated and to which an inner layer of tin bronze powder is integrally sintered. The pores in the powder metal layer are filled with a mixture of 80 percent polytetrafluoroethylene and 20 percent lead powder which is introduced into the pores of the bronze layer by a rolling process during the manufacture of the bushing. The inner face of the bushing 8 carries a thin surface layer of the plastic-lead mixture.

The aforedescribed bushing is a staple article of commerce. It was not considered useful for variable-speed transmissions of the type described prior to this invention because individual bushings of the same nominal dimensions differ significantly in their actual dimensions making it necessary to grind and/or polish the fixed shaft sleeve 1 for each individual pulley arrangement in order to provide the necessary precise fit between the frictionally engaged surfaces. It has been found that the cost of adapting the effective shaft diameter to each specific bushing 8 is well spent in view of the advantages of the arrangement.

The smoothly cylindrical bushing 8 is entirely divorced from the motion transmitting train which drives the pulley 3 and is thus subjected only to limited stresses which it can cope with successfully over long periods without suffering significant changes in shape or dimensions. During a running-in period, the superficial layer of lead and fluorocarbon is partly transferred from the inner bushing face to the outer face of the sleeve 1 and is partly abraded and axially discharged from the bearing interface. Thereafter, proper bearing clearance is established, and no further dimensional changes occur during the long useful life of the bearing arrangement. Lubrication or other maintenance is not normally required. Fretting corrosion cannot occur. The bushing is particularly well suited for absorbing the alternating compressive stresses to which it is exposed during each revolution of the shaft 10. The axial movement of the disc 3 required for proper speed change is not inhibited by significant friction between the lead-fluorocarbon mixture and the steel surface of the sleeve 1. The bushing is readily installed in the bore of the disc 3 by a force fit which is entirely sufficient since there are no significant stresses to be transmitted between the bushing 8 and the disc 3, the driving function being assumed exclusively by the coupling 4, 5.

In the modified transmission partly illustrated in FIG. 2, the shaft 10, 2' carries a sleeve 1' which projects axially beyond the shaft and has a transverse bore receiving a shaft 9 of stepped cylindrical shape whose axis is perpendicular to the axis of the shaft 10. The axially movable pulley disc 3' carries two cams 4' on its annular hub face directed away from the disc 2', the latter being fixedly fastened to the sleeve 1' as described with reference to the disc 2'. The faces of the cams slope obliquely relative to the axis of the shaft 10 in a common circumferential direction.

The reduced ends of the shaft 9 which project in opposite diametrical directions from the sleeve 1' carry rollers 5' which engage respective cam faces 4' when the belt 7' is received in the gap between the pulley discs 2', 3', the radially extending opposite faces of the discs being as described with reference to FIG. 1. An antifriction bushing 8' not significantly different from the aforedescribed bushing 8 is radially interposed between the hub of the disc 3' and the shaft 10 with its sleeve 1'.

The free end of the sleeve 1' carries a coaxial, cup-shaped cover 11 which spacedly envelops the exposed portion of the sleeve 1', the rollers 5', and most of the hub of the disc 3'. A helical compression spring centered in the axis of the shaft 10 is axially interposed between the bottom of the cover 11 and the disc 3' to urge the disc 3' into loose engagement with the belt 7' while the transmission is at rest. When the shaft 10 is turned, the rollers 5' initially travel on the cam faces 4', thereby shifting the disc 3' toward the left, as viewed in FIG. 2, against the restraint of the belt 7' and relieving the spring 6'.

Whereas the pins 4 couple the disc 3 to the shaft 10 in such a manner as to make all relative angular movement impossible, the roller clutch constituted by the shaft 9, rollers 5', and cams 4' permits limited angular displacement of the disc 3' on the shaft 10, and thereafter secures the disc on the shaft against further rotation.

It will be appreciated that the apex angles of the conical disc faces may be varied to suit specific belt configurations. It may be sufficient to make only one of the disc faces conical, and it is not necessary that the discs 2, 2' be fixedly mounted on the shaft 10 as long as their axial movement is prevented or at least limited.

While the specific materials of construction referred to in the description of the bushings 8, 8' are preferred at this time, those skilled in the art may find other materials to be adequate under less critical conditions than those contemplated here. Obviously, other fluorocarbons such as trifluorochloroethylene polymers may be substituted for the polytetrafluoroethylene specifically described, and soft, comminuted metals other than lead may be mixed with the fluorocarbon.

The driven half of the infinitely variable speed transmissions not explicitly shown in the drawing may be of the type shown in FIG. 1 or of the type shown in FIG. 2 with suitably reversed slopes of the cam faces in the motion-transmitting clutch. Obviously, the clutch may be adapted for transmitting motion in both circumferential directions by making the faces of the cams 4' approximately U-shaped when viewed in the direction of the axis of the shaft 9.

Other modifications and variations of the examples of the invention chosen for the purpose of the disclosure will readily suggest themselves to those skilled in the art on the basis of the above teachings, and it should be understood that, within the scope of the appended claims, the invention may be practiced otherwise than as specifically described.

What is claimed is:

1. An infinitely variable speed transmission comprising, in combination:
    a. a shaft having an axis and mounted for rotation about said axis;
    b. two discs mounted on said shaft and having spacedly opposite radially extending faces, one of said faces being conical and flaring away from the other face in a radially outward direction, said faces defining an annular gap therebetween;
    c. fastening means securing one of said discs on said shaft against axial movement;
    d. an antifriction bushing interposed between the other disc and said shaft for permitting axial movement of the other disc toward and away from said one disc,
        1. said bushing having a continuous metallic backing fixedly fastened to said other disc and a facing of porous sintered metal on said backing and engaging said shaft, the pores of said facing being filled at least partly with a solid fluorocarbon;
    e. coupling means in motion-transmitting engagement with a portion of said other disc spaced from said shaft and said bushing in a radially outward direction and with said shaft for securing said other disc on said shaft against relative angular movement while permitting axial displacement of said other disc;
    f. a V-belt in said gap; and
    g. pressure means for urging said other disc axially toward said V-belt and said one disc during said rotation of said shaft.

2. A transmission as set forth in claim 1, wherein said other disc has a bore conformingly receiving said bushing and is radially separated from said shaft by said bushing.

3. A transmission as set forth in claim 1, wherein said coupling means include a first motion-transmitting member secured to said shaft for rotation therewith and having a portion radially projecting from said shaft, and a second motion-transmitting member axially interposed between said portion of the first motion-transmitting member and said portion of said other disc in motion-transmitting engagement with said portions.

4. A transmission as set forth in claim 3, wherein said second motion transmitting member is an axially elongated rod circumferentially secured to each of said portions and slidably engaging one of said portions for relative axial movement.

5. A transmission as set forth in claim 3, wherein said coupling means include a clutch, said motion-transmitting members being elements of said clutch.

6. A transmission as set forth in claim 5, wherein said clutch includes cam means on said other disc member having a cam face extending circumferentially about said axis and sloping obliquely relative to said axis, said second motion-transmitting member being of circular cross section and rotatable about an axis transverse to said axis of the shaft in rolling engagement with said cam face, and said first motion-transmitting member securing said second motion-transmitting member for rotation with said shaft.

7. A transmission as set forth in claim 1, wherein the pores of said facing are filled with a mixture of a fluorocarbon and lead.

* * * * *